Figure 3:
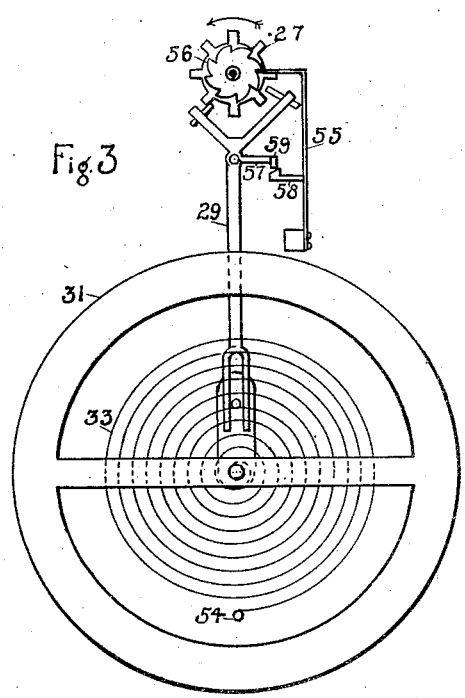

Aug. 17, 1926.
L. DORFMAN
1,596,410
EXCESS DEMAND METER
Filed Jan. 30, 1920        2 Sheets-Sheet 1
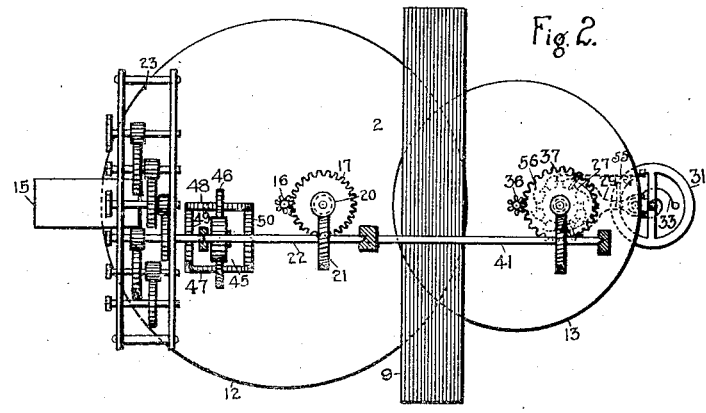
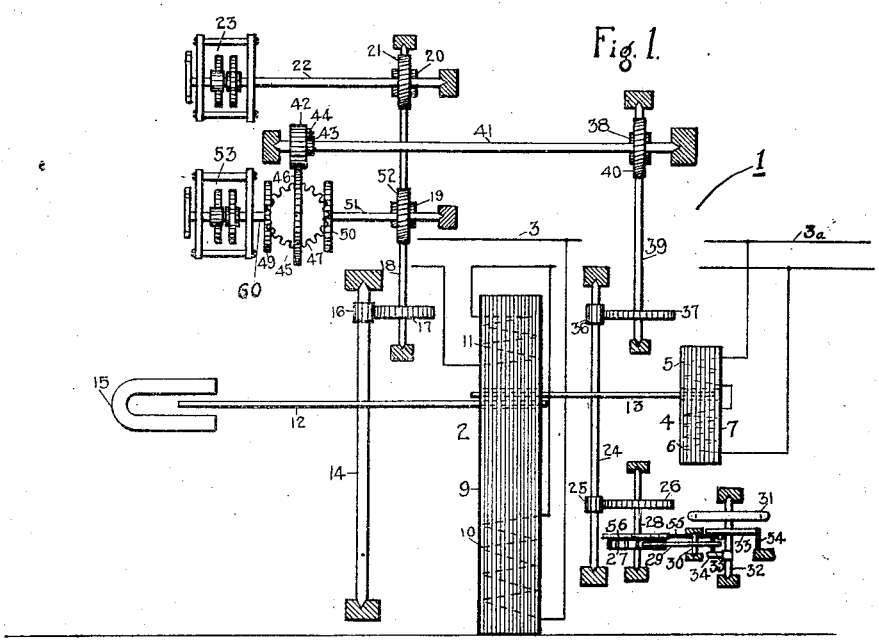
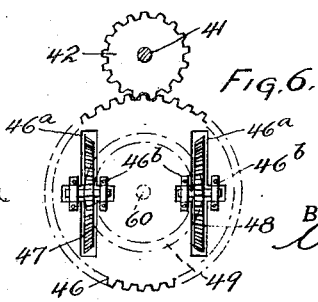
WITNESSES:
INVENTOR.
Leo Dorfman.
BY
ATTORNEY.

Aug. 17, 1926.

L. DORFMAN

EXCESS DEMAND METER

Filed Jan. 30, 1920

1,596,410

2 Sheets-Sheet 2

INVENTOR.
Leo Dorfman
BY Wesley G. Carr
ATTORNEY.

Patented Aug. 17, 1926.

1,596,410

UNITED STATES PATENT OFFICE.

LEO DORFMAN, OF WILKINSBURG, PENNSYLVANIA.

EXCESS-DEMAND METER.

Application filed January 30, 1920. Serial No. 355,274.

My invention relates to electrical measuring instruments and particularly to excess-demand meters.

One object of my invention is to provide an excess-demand meter having a constant-speed device that shall be actuated from the circuit to which the meter is connected.

Another object of my invention is to provide means whereby the speed of the constant-speed device may be maintained constant, irrespective of its actuating device.

A further object of my invention is to provide an excess-demand meter that shall be simple and inexpensive to construct and effective in its operation.

Peak loads on power stations are determining factors in the charge that must be made for the electrical energy distributed. The consumer is the party who, logically, must pay for the overhead cost of production. Clearly, individual consumers will have varying types of loads. In fact, different consumers' loads will vary in a manner similar to that of a power station, where the load of one consumer will be practically constant and of long duration, while the load of another will vary greatly, with peaks of varying duration. Proper analysis will show that the load on the power plant is simply a summation of all the individual consumers loads. This is true from instant to instant. It will be seen that the summation of a great many small peak loads, if the peaks are of short duration, may result in a high peak load on the station, or it may not, depending on whether these peaks occur at the same time or extend over a considerable time. However, if, from such small peaks, a peak does result on the station load, it cannot be of very long duration. Electrical apparatus, in general, is capable of standing considerable peak loads or overloads, provided they are of short duration. If the individual consumers have overloads or peak loads of considerable duration, the peak loads or overloads on the power station will be of considerable duration. In fact, the overloads may be of such long duration that the equipment cannot carry them, hence, equipment of greater capacity would have to be installed to take care of the consumers' excess demand. From the foregoing discussion, it may be seen that the magnitude of a consumers' maximum peak load is not of such vital interest in the making of rates as is the amount of energy consumed in the peak. In other words, the duration of the peak is of great consequence.

From the foregoing, it is evident that each consumer should pay a certain rate of charge for all energy consumed at a rate of consumption less than a predetermined amount and should pay a greater rate of charge for all energy consumed at a rate of consumption greater than the predetermined amount per unit of time.

In view of the above, I provide a watthour meter that integrates the total energy traversing a circuit. A constant-speed device is electromagnetically actuated, and a differential device is disposed between the movable member of the watthour meter and the constant-speed device to obtain a speed equivalent to the difference in the two mentioned moving elements. Also, suitable means, such as a pawl and ratchet, is employed for preventing the subtraction of the equivalent speeds except when the speed of the watthour moving element is greater than the equivalent speed of the constant-speed device. A suitable means for so controlling the speed of the constant-speed device as to maintain the same constant is employed. A suitable counter or integrating device, such as is used in an ordinary watthour meter, is employed to integrate the differential speed of the two moving devices.

Figure 4:
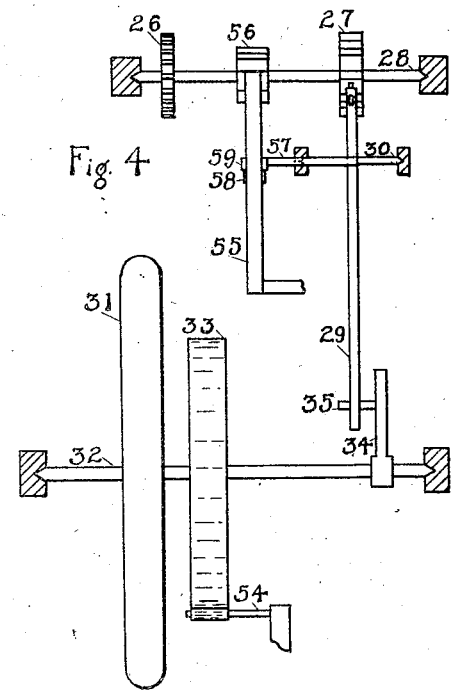
Figure 5:
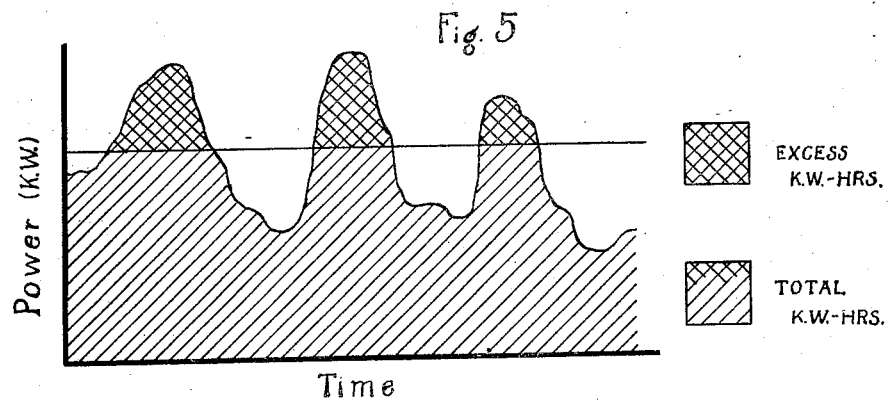

Figure 1 of the accompanying drawings is an elevational view of an excess-demand watthour meter embodying my invention; Fig. 2 is a top plan view of a portion of the meter shown in Fig. 1; Fig. 3 is a detail top plan view of the escapement mechanism shown in Fig. 1; Fig. 4 is the side elevational view of the escapement shown in Fig. 3; Fig. 5 is a diagrammatic representation of the variations that may occur in a consumers load during a period of time; and Fig. 6 is an enlarged detail view of a differential-gear mechanism embodied in my invention.

In Figs. 1 and 2 of the drawings, an actuating electromagnet 2 for the meter 1 comprises a magnetizable core member 9 having a potential winding 10 and a current winding 11 thereon that are connected to the main circuit 3. The magnetizable member 9 co-operates with the windings 10 and 11 to actuate a disc armature 12 that is mounted on a shaft 14. A permanent magnet 15 is provided for so damping the disc armature 12, as in the ordinary watthour meter, that the armature 12 shall rotate at a speed proportional to the power traversing the circuit 3. A pinion 16, that is mounted on the shaft 14, engages a gear wheel 17 that is mounted upon a shaft 18 upon which shaft are also mounted two worm screws 19 and 20. A worm wheel 21, that is mounted on the shaft 22, engages the worm screw 20. The shaft 22 actuates a counter or integrating device 23 to thus indicate the total energy measured.

A disc armature 13 is actuated either by an electromagnet 4 or the electromagnet 9 or by both electromagnets, as desired.

The electromagnet 4 comprises a magnetizable core member 7 having two series-connected windings 5 and 6 deriving their energy from a circuit 3a. The disc armature 13 is mounted upon a shaft 24 upon which a pinion 25 is also mounted. The pinion 25 engages a gear wheel 26 that is mounted upon a shaft 28. An escapement wheel 27 and a ratchet wheel 56 are also mounted on the shaft 28. An escapement lever 29 is mounted on a shaft 30 and co-operates with the escapement wheel 27 and a balance wheel 31. The balance wheel 31 is mounted on a shaft 32 to which one end of a coiled hair spring 33 for oscillating the balance wheel 31 is connected, the other end of the spring being connected to a support 54. An arm 34 on the shaft 32 is provided with a roller-jewel 35 that engages the fork of the escapement lever 29.

My copending application, Serial No. 335,273, filed Jan. 30, 1920, discloses an escapement device for obtaining constant speed irrespective of the torque of the disc armature. Figs. 3 and 4 of the drawings illustrate an escapement device of this character. The escapement wheel 27 is released tooth by tooth by the action of the balance wheel 31 through the escapement lever 29. However, the construction of the escapement wheel teeth is such that no energy is imparted by them to the oscillating member or the balance wheel 31. Rotation of the spindle 28, as shown by the arrow, rotates a ratchet wheel 56. A leaf spring 55 is flexed by the ratchet teeth of the ratchet wheel 56 as the free end of the spring travels up each tooth to the tooth's apex. When the apex of the tooth is reached, the spring attempts to drop back to its original position, but, at this point, a pallet 59 on an arm 57 on the member 29 is in position to engage a shoe 58 on the spring 55. When thus engaged, the spring 55 cannot return to its original position until the shoe 58 is released by the movement of the pallet 59. As the oscillating member or balance wheel 31 returns on its path of oscillation, a point is reached at which the movement of the arm 57 and pallet 59 releases the shoe 58. At this instant, the inclined side or surface of the shoe 58, under the action of the spring 55, slides over the pallet 59 on the arm 57, thereby actuating the same. Since the arm 57 is mounted on the escapement lever 29, the force is imparted to the same and to the balance wheel 31. Thus, the energy necessary for oscillating the oscillating member is delivered indirectly, in constant quantities and at a proper time in the cycle of oscillation of the oscillating member or balance wheel 31.

The shaft 24, upon which the armature 13 is mounted, has a pinion 36 mounted thereon that engages a gear wheel 37 that is mounted on a shaft 39 upon which a worm screw 38 is also mounted. The worm screw 38 engages a worm wheel 40 that is mounted on a shaft 41 upon which a gear wheel 42 is loosely mounted. A ratchet wheel 43 is mounted rigidly on the shaft 41 adjacent to the gear wheel 42. A pawl 44 is attached to the gear wheel 42 and engages the ratchet wheel 43. The pawl 44 and ratchet wheel 43 are so mounted with reference to the direction of rotation of the shaft 41 that, if the gear wheel 42 is held stationary, the pawl 44 slips over the ratchet wheel 43. The gear wheel 42 engages a gear wheel 46 of a differential mechanism 45.

The differential mechanism 45 comprises the gear wheel 46 having parallel slots 46a in which gear wheels 47 and 48 are so mounted, as by bearings 46b, that they are free to rotate about their centers but revolve with the gear wheel 46. The gear wheels 47 and 48 engage two other gear wheels 49 and 50. The gear wheel 50 is mounted on a shaft 51, and the gear wheel 49 is mounted on a shaft 60 that actuates a counter or integrating device 53. A worm wheel 52, that is also mounted on the shaft 51, engages the worm screw 19 on the shaft 18.

In the differential mechanism 45, the gear wheel 49 will remain stationary so long as the gear wheels 46 and 50 move at equivalent speeds. Since the pawl and ratchet 44 and 43 are so arranged that they slip with respect to each other when the shaft 41 rotates, it is evident that the gear wheel 46 will not rotate at a speed equivalent to that of shaft 41 until the pawl and ratchet become locked. The two gear wheels 46 and 50 cannot move at equivalent speeds if the speed of the gear wheel 50 attains a greater speed than that of the equivalent speed of the shaft 41. Therefore, if the speed of the gear wheel 50 exceeds the equivalent speed of the shaft 41, the pawl and ratchet must lock and the gear wheel 49 will then move at a speed equivalent to the difference between the speed of the shaft 51 and the equivalent speed of the shaft 41. This difference in equivalent speeds is summed up, or integrated, by the counter 53 and represents the excess demand for energy, when reduced to the proper terms of calibration.

From the above, it will be understood that the integrating device 23 measures the total area of the figure shown in Fig. 5, while the integrating device 53 only measures that portion represented by the cross hatched lines. That is, the armature 12 drives the integrating device 22 through the shaft 14, pinion 16, gear wheel 17, shaft 18, worm screw 20, gear wheel 21 and shaft 22, and that the integrating device 53 is only actuated in accordance with the difference in the equivalent speeds of the armatures 12 and 13.

The armature 13 is actuated at a constant speed equivalent to a predetermined value of energy, as indicated by the watthour meter, by reason of the escapement device, irrespective of the actuating force imparted to the armature 13 by the actuating means.

My invention is not limited to the specific structure illustrated, as various modifications may be made therein without departing from the spirit and scope of the invention, as set forth in the appended claims.

I claim as my invention:

1. An electrical measuring instrument comprising an indicating device, an electro-responsive device, a member actuated by said electro-responsive device to move in accordance with a quantity to be measured, a constant-speed member actuated by said electro-responsive device and means for causing the quantity-responsive member to actuate the indicating device only when the speed of the quantity-responsive member has a certain relation to the speed of the constant-speed member.

2. An electrical measuring instrument comprising an indicating device, a motor field structure energized in accordance with a quantity to be measured, a rotor actuated by said field structure in accordance with said quantity, a second rotor actuated by said field structure, means for causing said second rotor to rotate at a constant speed, and a differential gear mechanism connected to said rotor and to the indicating device whereby the latter is operated only when the speed of the first rotor exceeds the speed of the second rotor.

3. An electrical measuring instrument comprising an indicating device, a motor field structure energized in accordance with a quantity to be measured, a rotor actuated by said field structure in accordance with said quantity, a second rotor actuated by said field structure, an escapement device for causing said second rotor to rotate at a constant speed, and means for causing the first rotor to operate the indicating device only when the speed of the first rotor exceeds the speed of the second rotor.

4. An electrical measuring instrument comprising an indicating device, a motor field structure energized in accordance with a quantity to be measured, a rotor actuated by said field structure in accordance with said quantity, a second rotor actuated by said field structure, an escapement device for causing said second rotor to rotate at a constant speed, and a differential gear mechanism connected to said rotors and to the indicating device whereby the latter is operated only when the speed of the first rotor exceeds the speed of the second rotor.

5. An electrical measuring instrument comprising an indicating device, a motor field structure energized in accordance with a quantity to be measured, a rotor actuated by said field structure in accordance with said quantity, a second motor field structure, a constant-speed rotor associated with both of said field structures for selective actuation thereby, and means for causing the first rotor to operate the indicating device only when the speed of the first rotor has a certain relation to the speed of the second rotor.

6. An electrical measuring instrument comprising an indicating device, a motor field structure energized in accordance with a quantity to be measured, a rotor actuated by said field structure in accordance with said quantity, a second rotor actuated by said field structure, means for causing said second rotor to rotate at a constant speed and means for causing the first rotor to operate the indicating device only when the speed of the first rotor has a certain relation to the speed of the second rotor.

In testimony whereof, I have hereunto subscribed my name this 21st day of January 1920.

LEO DORFMAN.